United States Patent
Hsu et al.

(10) Patent No.: US 7,746,514 B2
(45) Date of Patent: *Jun. 29, 2010

(54) SCANNER AND EXPOSURE CONTROL METHOD THEREOF

(76) Inventors: Hung-Yi Hsu, 14F.-3, No. 51, Chaoyang St., Taoyuan City, Taoyuan County 330 (TW); Sei-For Hsu, No. 561, Baidi St., Jhubei City, Hsinchu County 302 (TW); Ming-Fu Hsu, No. 51, Jinshan N. 1st St., Hsinchu City 300 (TW); Shing-Chia Chen, No. 12, Ciaoyan Rd., Ciaotou Township, Kaohsiung County 825 (TW)

( * ) Notice: Subject to any disclaimer, the term of this patent is extended or adjusted under 35 U.S.C. 154(b) by 1485 days.

This patent is subject to a terminal disclaimer.

(21) Appl. No.: 11/098,569

(22) Filed: Apr. 5, 2005

(65) Prior Publication Data

US 2005/0231768 A1  Oct. 20, 2005

(30) Foreign Application Priority Data

Apr. 14, 2004  (TW) .............................. 93110385 A
Feb. 25, 2005  (TW) .............................. 94105960 A

(51) Int. Cl.
  *H04N 1/04* (2006.01)
(52) U.S. Cl. .................. 358/474; 358/475; 358/509; 358/497; 382/274; 382/275
(58) Field of Classification Search .............. 358/474, 358/497, 496, 486, 475, 509; 382/274, 275, 382/167; 300/203, 368, 373, 215, 367
See application file for complete search history.

(56) References Cited

U.S. PATENT DOCUMENTS

| 5,410,347 | A  | * | 4/1995  | Steinle et al. | 348/270 |
| 5,805,311 | A  | * | 9/1998  | Phillips | 358/500 |
| 5,828,407 | A  | * | 10/1998 | Suzuki | 348/312 |
| 5,893,011 | A  | * | 4/1999  | Yoshida et al. | 399/203 |
| 6,075,236 | A  | * | 6/2000  | Lamproye et al. | 250/208.1 |
| 6,307,061 | B2 | * | 10/2001 | Ito et al. | 548/577 |
| 6,750,994 | B1 | * | 6/2004  | Yamamoto | 358/522 |
| 7,408,682 | B2 | * | 8/2008  | Ide | 358/461 |
| 7,564,597 | B2 | * | 7/2009  | Chueh | 358/474 |
| 2002/0015196 | A1 | * | 2/2002  | Kitamura et al. | 358/505 |
| 2003/0189736 | A1 | * | 10/2003 | Ikeda | 358/475 |
| 2004/0236219 | A1 | * | 11/2004 | Liu et al. | 600/437 |
| 2004/0263915 | A1 | * | 12/2004 | Park | 358/461 |

* cited by examiner

*Primary Examiner*—Negussie Worku

(57) ABSTRACT

A scanner includes a scan flatbed, an optical module, a driving source, and an exposure control unit. The scan flatbed is for carrying a to-be-scanned document. The optical module includes a photo sensing device, for reading N scan lines of the to-be-scanned document. The driving source, used for driving the optical module, includes an encoder for outputting a position signal corresponding to a position of the optical module. The exposure control unit, including a timer, controls exposure time for each scan line to be constant according to the position signal. The scan method includes driving the optical module to read the scan lines of the to-be-scanned document and output the corresponding position signal; and controlling the photo sensing device to read each scan line of the to-be-scanned document for a constant period of time according to the position signal.

22 Claims, 11 Drawing Sheets

SCANNER AND EXPOSURE CONTROL METHOD THEREOF

This application claims the benefits of Taiwan applications, Serial No. 93110385, filed Apr. 14, 2004, and Serial No. 94105960, filed Feb. 25, 2005, the subject matter of which is incorporated herein by reference.

BACKGROUND OF THE INVENTION

1. Field of the Invention

The invention relates in general to a scanner and exposure control method thereof, and more particularly to a scanner, of which the driving source has speed non-uniformity issue, and exposure control method thereof.

2. Description of the Related Art

Referring to FIG. 1A, a schematic structure diagram of a conventional scanner is shown. The scanner 100 includes a scan flatbed 110, an optical module 120, a driving source 130, and an application specific integrated circuit (ASIC) 140. The driving source 130 drives the optical module to move at a constant speed, in the meanwhile the photo sensing device 122, such as a charge coupled device (CCD), captures images from several scan lines of the to-be-scanned document 111 on the scan flatbed 110. The driving source 130 has an encoder 132 for outputting a position signal PF. The ASIC 140 controls the driving source according to the position signal PF to exactly position the moving optical module 120, and thus images captured from the scan lines can be assured of having a uniform width.

However, due to slight variation on the constant speed control of the driving source, the exposure time for each of the scan lines can be varied. As shown in FIG. 1B, the scanner 100 determines the exposure time T1, T2, and T3 for the photo sensing device 122 reading the to-be-scanned document 111 according to the position signal PF. If the driving source drives the optical module 120 to move at a predetermined constant speed, the exposure time for a scan line is set to be T1=t2−t0. If the driving source 130 drives the optical module 120 to read a certain scan line at a speed larger than the predetermined constant speed, the exposure time for this scan line is set to be T2=t1−t0. If the driving source drives the optical module to read a certain scan line at a speed smaller than the predetermined constant speed, the exposure time for this scan line is set to be T3=t3−t0. Since the starting point and ending point of the exposure for the scan lines are both controlled by the feedback position signals, the exposure time T1, T2, and T3 for different scan lines will be unequal. According to the formula: exposure amount=light density of the to-be-scanned document 111×responsibility of the photo sensing device 122×exposure time×gain of the analog front end (AFE), the exposure amount for each scan line is not constant, thereby reducing scan image quality.

Referring to FIG. 1C, a circuit block diagram of the scanner using a DC motor for the position feedback control disclosed by U.S. Pat. No. 6,037,584, is shown. For the light density of the to-be-scanned document 111 and the responsibility of the photo sensing device is usually constant in the whole scan process, in order to solve the above-mentioned issue of unequal exposure amount for each scan line, the invention disclosed in the cited patent dynamically adjusts the AFE gain to compensate the different exposure time such that the exposure amount for each scan line is equal.

The optical module 170 of the scanner 150 is driven to scan the to-be-scanned document (not shown in the figure) by the DC motor 160. The DC motor 160 has an encoder 162 for outputting a position signal PF to the timer 182 of the ASIC 180. The exposure control unit 184 controls the exposure time of the CCD 172 in the optical module 170 for reading each scan line of the to-be-scanned document according to the position signal PF. The data read by the CCD 172 are output to the analog amplifying unit for further amplification. The ASIC 180 of the cited patent further includes a gain control unit 186. The gain control unit 186 dynamically adjusts the AFE gain of the analog amplifying unit 174 to compensate the varied exposure amount due to the unequal exposure time for each scan line according to the control of the exposure control unit 184 and the timer 182.

However, the scanner disclosed by the above-mentioned patent requires extra complicated circuits, such as the gain control unit 186, thereby increasing the manufacturing cost, in order to dynamically adjust the AFE gain. Moreover, the AFE gain compensation disclosed in the patent is a kind of analog signal compensation requiring extra time for converting digital signals to analog signals. For the analog signals are easily interfered by the exterior noise in the transmission process, and the linearity of the analog signal compensation is poor, the scan image quality cannot be effectively improved.

SUMMARY OF THE INVENTION

It is therefore an object of the invention to provide a scanner and exposure control method thereof. The exposure control unit controls the exposure time for each scan line to be constant according to the position feedback signal of the driving source so as to provide scan images of stable quality.

The invention achieves the above-identified object by providing a scanner for scanning a plurality of scan lines of a to-be-scanned document. The scanner includes an optical module, a driving source, a detecting device, and an exposure control unit. The optical module, including at least a photo sensing device is for exposing the scan lines of the to-be-scanned documents and generating corresponding image data. The driving source is for generating a relative movement between the optical module and the to-be-scanned document. The detecting device is for detecting the relative movement between the optical module and the to-be-scanned document, and generating a corresponding signal. The exposure control unit, including a timer, is for controlling the exposure time for each scan line to be a constant value. The exposure control unit determines a starting point of the exposure time according to the signal.

The invention achieves the above-identified object by providing another scanner for scanning a plurality of scan lines of a to-be-scanned document. The scanner includes an optical module, a driving source, and an exposure control unit. The optical module, including at least a photo sensing device, is for exposing the scan lines of the to-be-scanned document and outputting corresponding image data. The driving source is for generating a relative movement between the optical module and the to-be-scanned document. The exposure control unit, including a timer, is for controlling the photo sensing device to read each scan line for a constant period of time.

The invention achieves the above-identified object by providing a scan method applied in a scanner for scanning N scan lines of a to-be-scanned document. The method includes setting the value K to be 1;, generating a K-th position of the optical module relative to the to-be-scanned document corresponding to a K-th scan line of the to-be-scanned document; detecting the K-th position and outputting a K-th position signal accordingly; determining a K-th starting point of the exposure of the K-th scan line according to the K-th position signal; exposing the K-th scan line for a constant period of time starting from the K-th starting point; and adding the value K by 1, if the value K is smaller than N, and returning to the step of generating the K-th position.

The invention achieves the above-identified object by providing another scan method applied in a scanner for scanning N scan lines of a to-be-scanned document. The method includes setting the value K to be 1;, generating a K-th position of the optical module relative to the to-be-scanned document; exposing a K-th scan line for a constant period of time; and adding the value K by 1, if the value K is smaller than N, and returning to the step of generating the K-th position by the driving source.

Other objects, features, and advantages of the invention will become apparent from the following detailed description of the preferred but non-limiting embodiments. The following description is made with reference to the accompanying drawings.

DETAILED DESCRIPTION OF THE INVENTION

Embodiment One

Figure 1A:
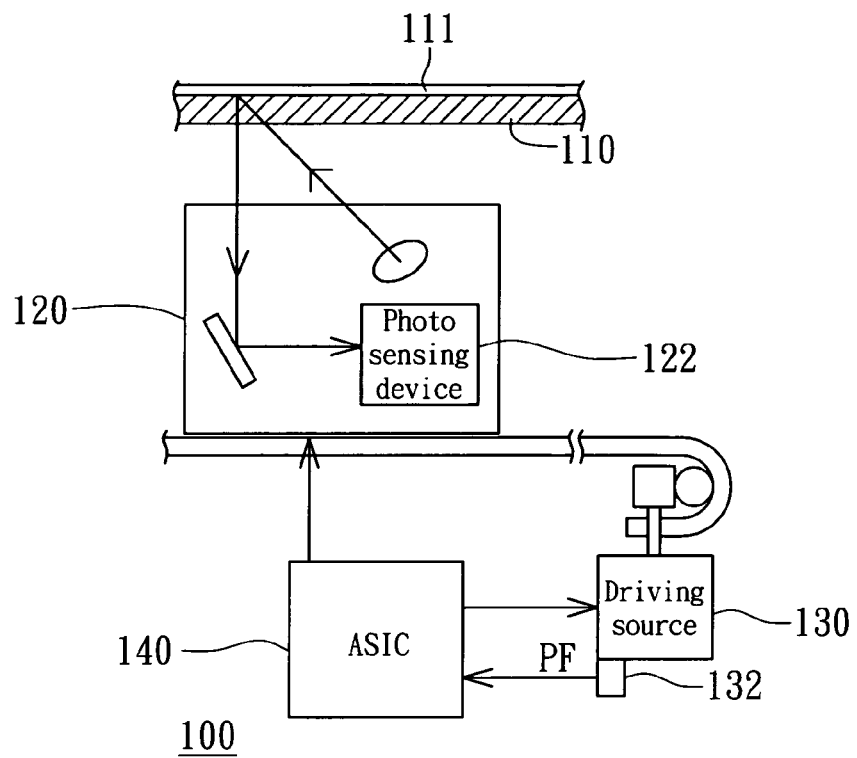
FIG. 1A (Prior Art) is a schematic structure diagram of a conventional scanner.
Figure 1B:
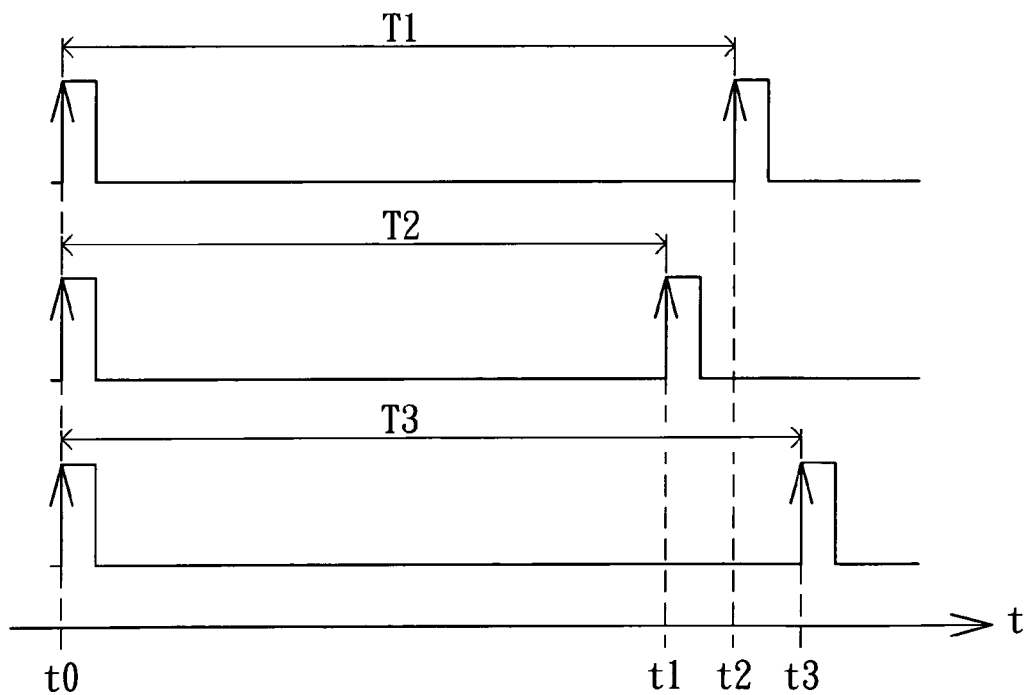
FIG. 1B (Prior Art) is a diagram of the CCD exposure timing control in FIG. 1A.
Figure 1C:
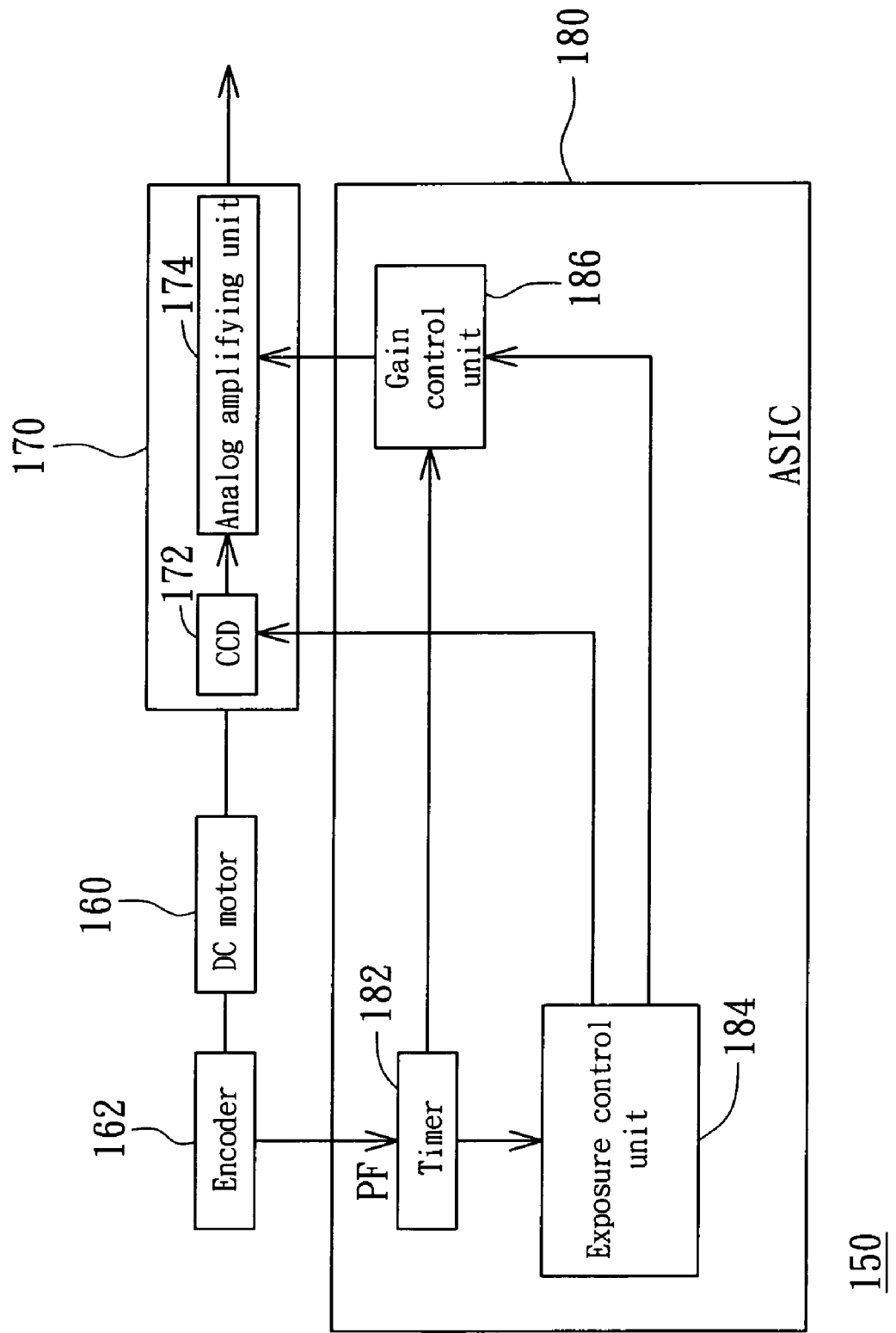
FIG. 1C (Prior Art) is a circuit block diagram of the scanner using a DC motor for the position feedback control disclosed by U.S. Pat. No. 6,037,584.
Figure 2A:
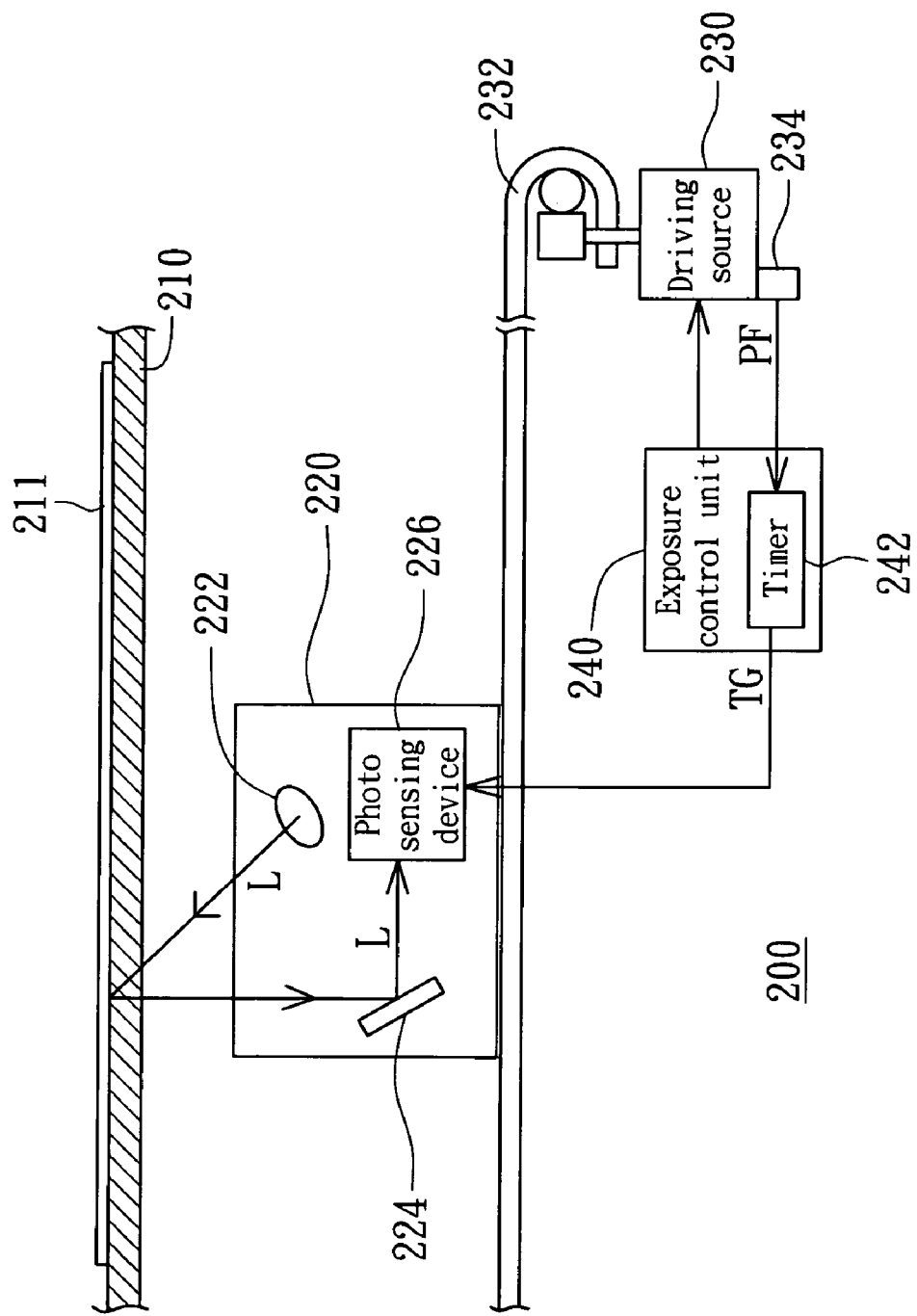
FIG. 2A is a schematic diagram of the scanner according to the first embodiment of the invention.

Referring to FIG. 2A, a schematic diagram of the scanner according to the first embodiment of the invention is shown. The scanner 200 includes a scan flatbed 210, an optical module 220, a driving source 230 (a DC motor is exemplified here) and an exposure control unit 240, such as an ASIC. The scan flatbed 210 is for carrying the to-be-scanned document 211 (the reflective document is exemplified). The optical module 220 includes a light source 222, a mirror 224, and a photo sensing device 226, such as a CCD or a contact image sensor (CIS). The to-be-scanned document 211 reflects the light L emitted from the light source 222 to the mirror 224, and the light L reflected by the mirror 224 is received by the photo sensing device 226. The photo sensing device 226 is for reading N scan lines (not shown in the figure) of the to-be-scanned document 211. In terms of a 600, dpi scanner, the to-be-scanned document 211 has 600, scan lines per inch.

The driving source 230 is used for driving the optical module 220 via the timing belt 232. The driving source has a detecting device 234, such as an encoder, for detecting the relative movement between the optical module 220 and the to-be-scanned document 211, and outputting a position signal PF accordingly. Moreover, the ASIC 240 includes a timer 242 for controlling the exposure time for each scan line to be a constant value.

Figure 2B:
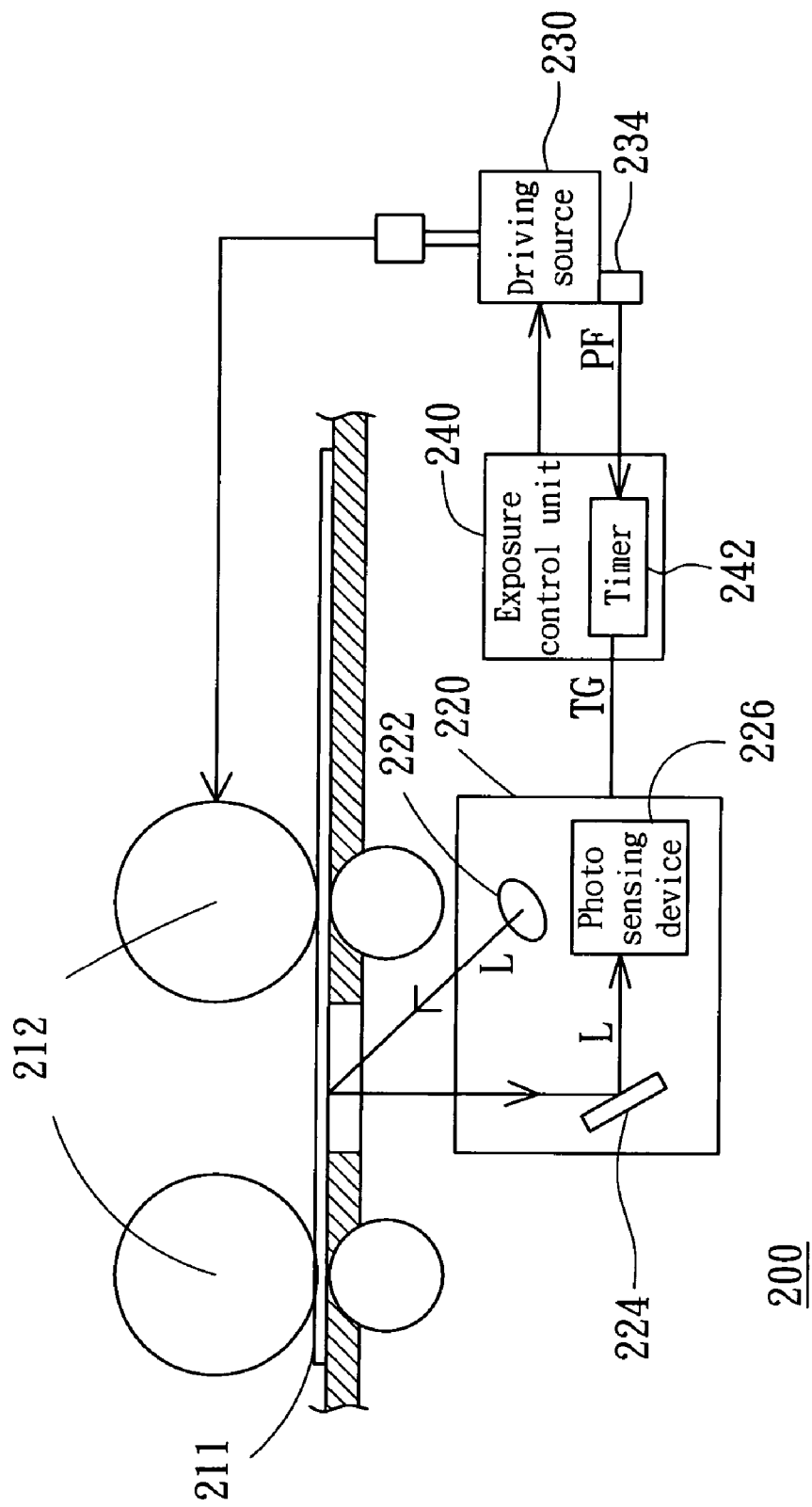
FIG. 2B is a schematic structure diagram of another scanner according to the first embodiment of the invention.

Referring to FIG. 2B, a schematic structure diagram of another scanner according to the first embodiment of the invention is shown. The scanner 200 includes a document feeding device 212, an optical module 220, a driving source 230 (a DC motor is exemplified here), and an exposure control unit 240. Different from the scanner 200 of FIG. 2A, the driving source 230 drives the document feeding device 212 to feed in the to-be-scanned document 211 such that the document 211 has a relative movement to a fixed optical module 220. The remaining parts are the same as those of the scanner 200 of FIG. 2A, so any detailed description is not necessarily given here.

Figure 2C:
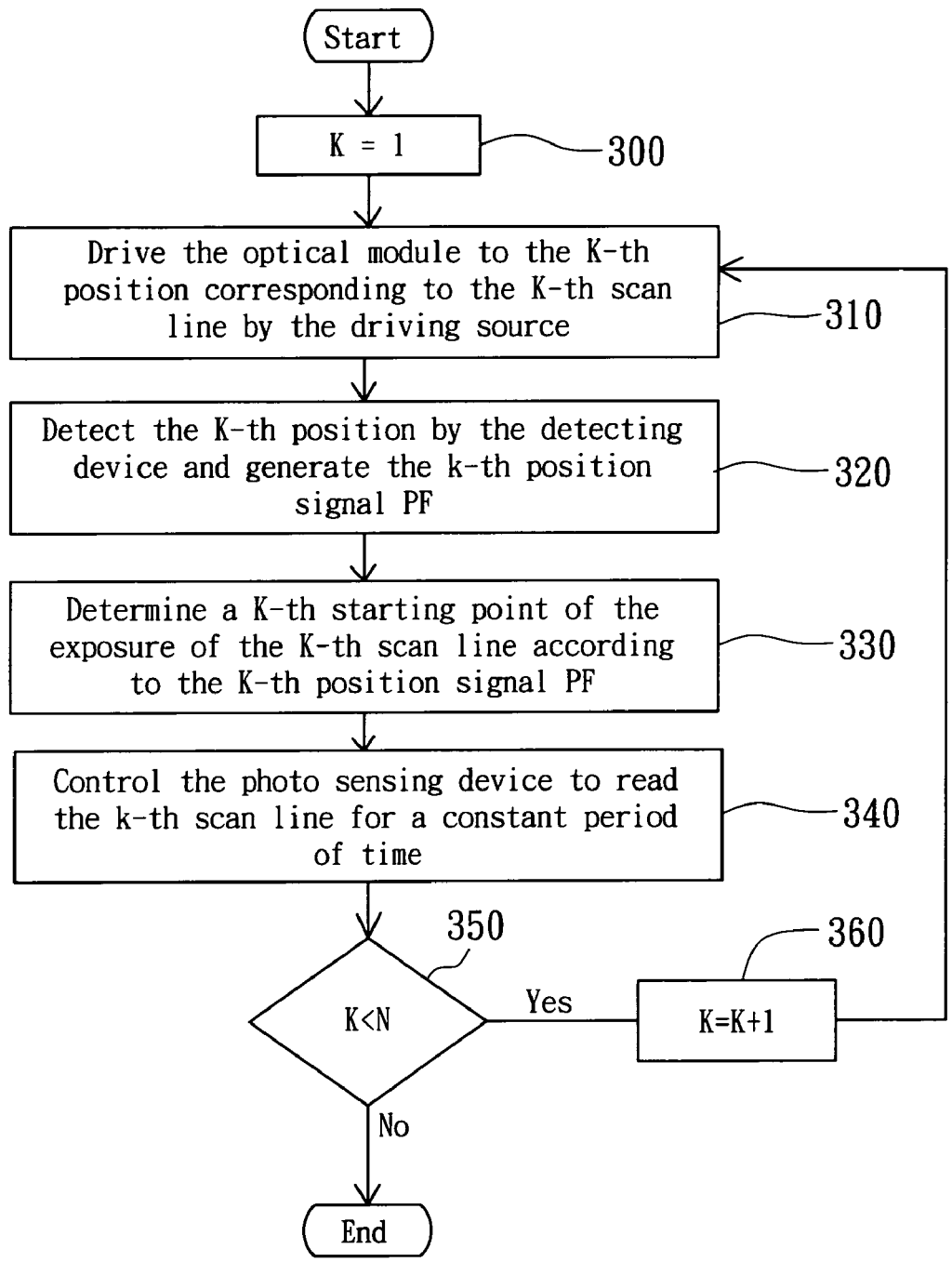
FIG. 2C is a flow chart of the scanning method according to the first embodiment of the invention.

Referring to FIG. 2C, a flow chart of the scanning method according to the first embodiment of the invention is shown. First, in step 300, set the value K to be 1. Next, in step 310, drive the optical module 220 to the K-th position by the driving source 230 to read the K-th scan line of the to-be-scanned document 211. In step 320, detect the K-th position by the detecting device 234 and output the k-th position signal PF corresponding to the K-th position. In step 330, determine a K-th starting point of the exposure of the K-th scan line by the ASIC 240 according to the K-th position signal PF. Afterward, in step 340, control the photo sensing device 226 to read the k-th scan line for a constant period of time starting from the K-th starting point. Last, in step 350, determine if the value K is smaller than N. If the value K is smaller than N, proceed to the step 360 to add the value K by 1, and return to the step 310. If the value K is not smaller than N, end the scan process.

Figure 2D:
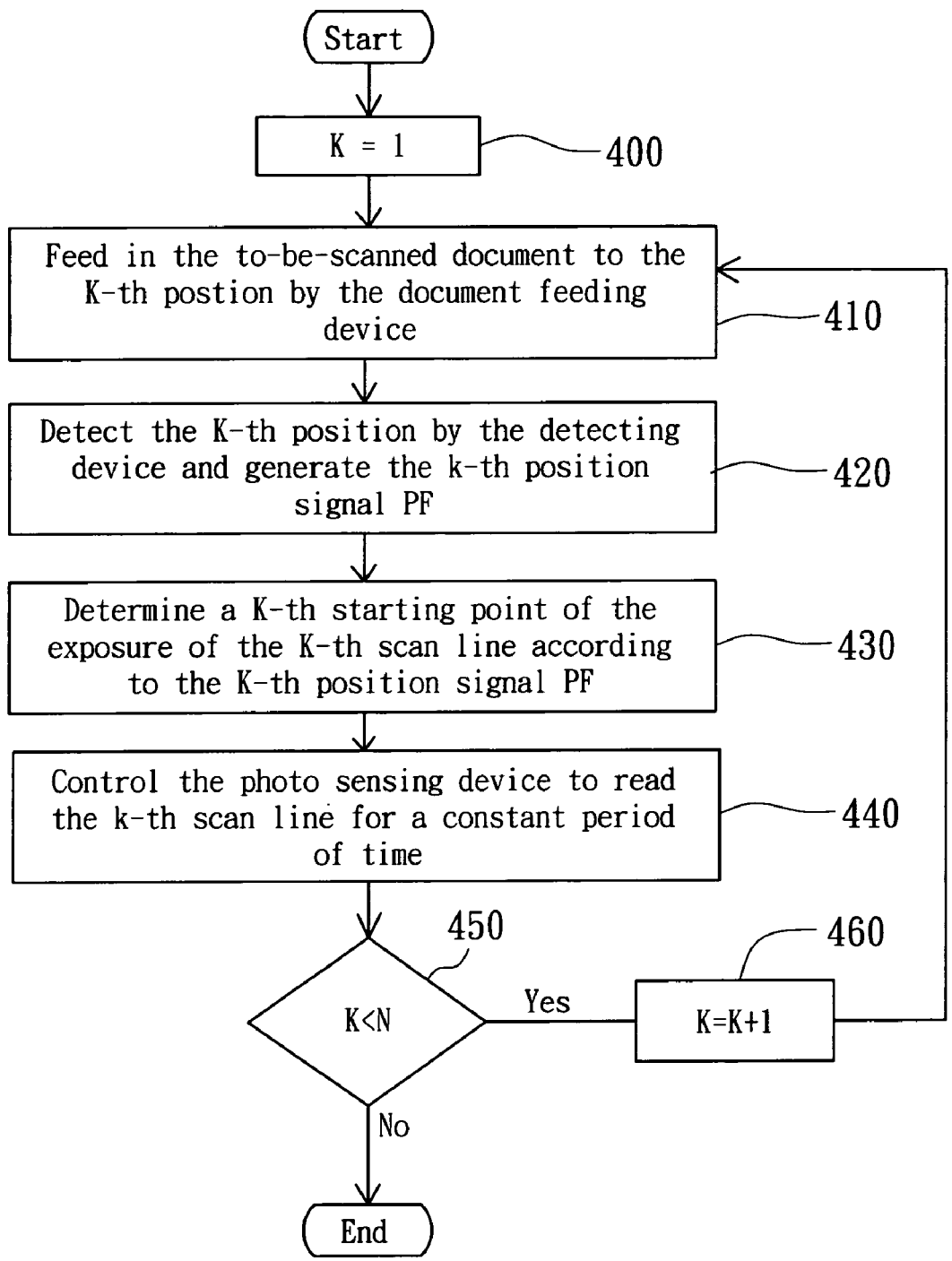
FIG. 2D is a flow chart of another scanning method according to the first embodiment of the invention.

Referring to FIG. 2D, a flow chart of another scanning method according to the first embodiment of the invention is shown. Different from the method of FIG. 2C, in the step 410, the driving source 230 is used to drive the document feeding device 212 to feed in the to-be-scanned document 211 to the K-th position for the optical module to read the K-th scan line of the to-be-scanned document. The remaining steps are substantially the same as the method of FIG. 2C, so any detailed description is not necessarily given here.

As mentioned above, although the driving source 230 drives the optical module 220 at a constant speed, in fact, each moving step of the optical module 220 takes time of slight difference. Therefore, the exposure time of each scan line is different, resulting in different exposing amount for each scan line, and influencing scan image quality. The object of the invention is to have a constant exposure time for each scan line and thus an equal exposing amount for each scan line.

Figure 2E:
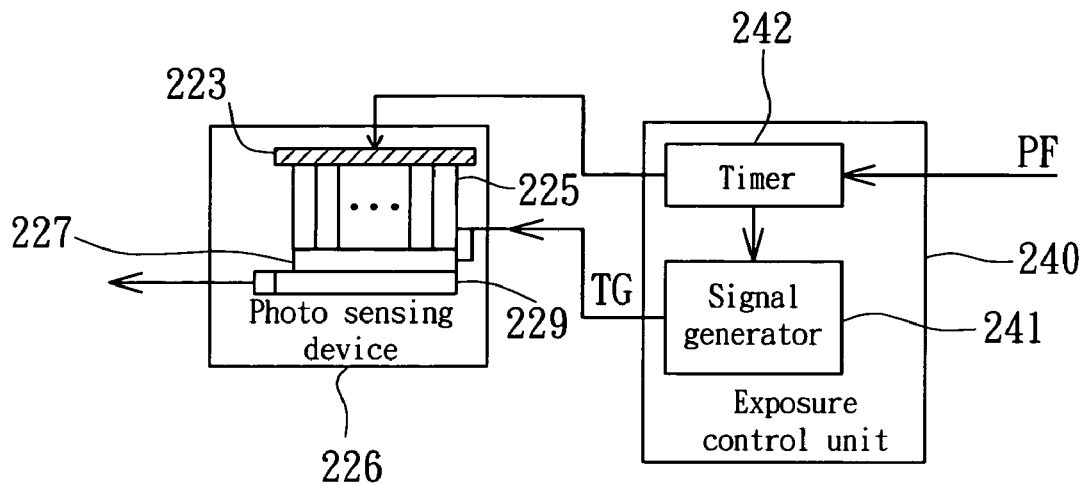
FIG. 2E is a schematic structure diagram of the exposure control unit for controlling the photo sensing device according to the invention.

Referring to FIG. 2E, a schematic structure diagram of the exposure control unit for controlling the photo sensing device 226 according to the invention is shown. The photo sensing device 226 includes an electronic shutter 223, a photo diode 225, and an analog shift register 229, and the photo diode 225 has a transfer gate 227. The electronic shutter 223 is for controlling the time for the photo diode 225 to receive light. When the electronic shutter 223 is in an open state, charges of the photo diode 225 flow out continuously for the photo diode 225 cannot accumulate charges. The exposure control unit 240 includes a signal generator 241 and a timer 242. The signal generator 242 is for sending out a control signal TG to the transfer gate 227 for controlling the charges accumulated in the photo diode 225 to be transferred to the shift register 229.

Figure 2F:
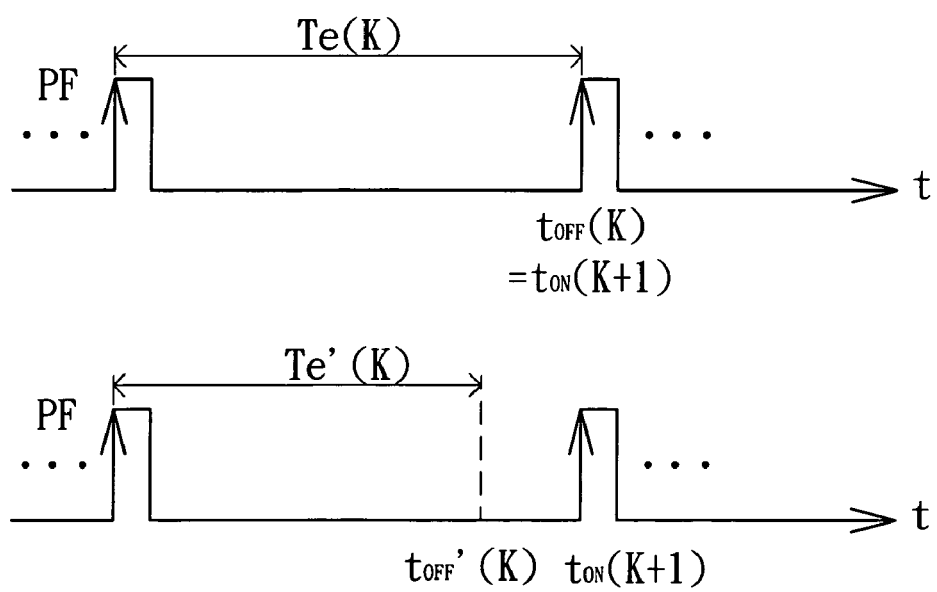
FIG. 2F is a diagram of the exposure timing control of the photo sensing device in FIG. 2A compared to the prior art.

Referring to FIG. 2F at the same time, a diagram of the exposure timing control of the photo sensing device 226 in FIG. 2A compared to the prior art is shown. The timer 242 controls the starting point ton(k) of the exposure of each scan line via the signal generator 241 according to the position signal PF, wherein k=1~N. In the prior art, the ending point toff(k) of the exposure of the k-th scan line is same as the starting point ton(k+1) of the exposure of the (k+1)-th scan line, as shown in the upper figure of FIG. 2F. The ending point toff(k) is different due to the varied moving speed of the optical module driven by the driving source 230, thereby resulting in the unequal exposure time Te(k) (=toff(k)−ton(k)).

However, in the invention the timer 242 controls the electronic shutter 223 and determines the end point toff'(k) by switching the electronic shutter 223. Therefore, the exposure time Te'(k) (=toff'(k)−ton(k)) can be controlled constant as shown in the lower figure of FIG. 2F. Moreover, the constant value Te'(k) is slightly smaller than the time interval from the starting point of the exposure of one scan line to the starting point of the exposure of the successive scan line, that is, ton(k+1)−ton(k), wherein k=1~N. Therefore, it can be assured that the photo sensing device 226 reads each scan line for sufficient and constant exposure time, thereby improving the scan image quality.

Embodiment Two

Figure 3A:
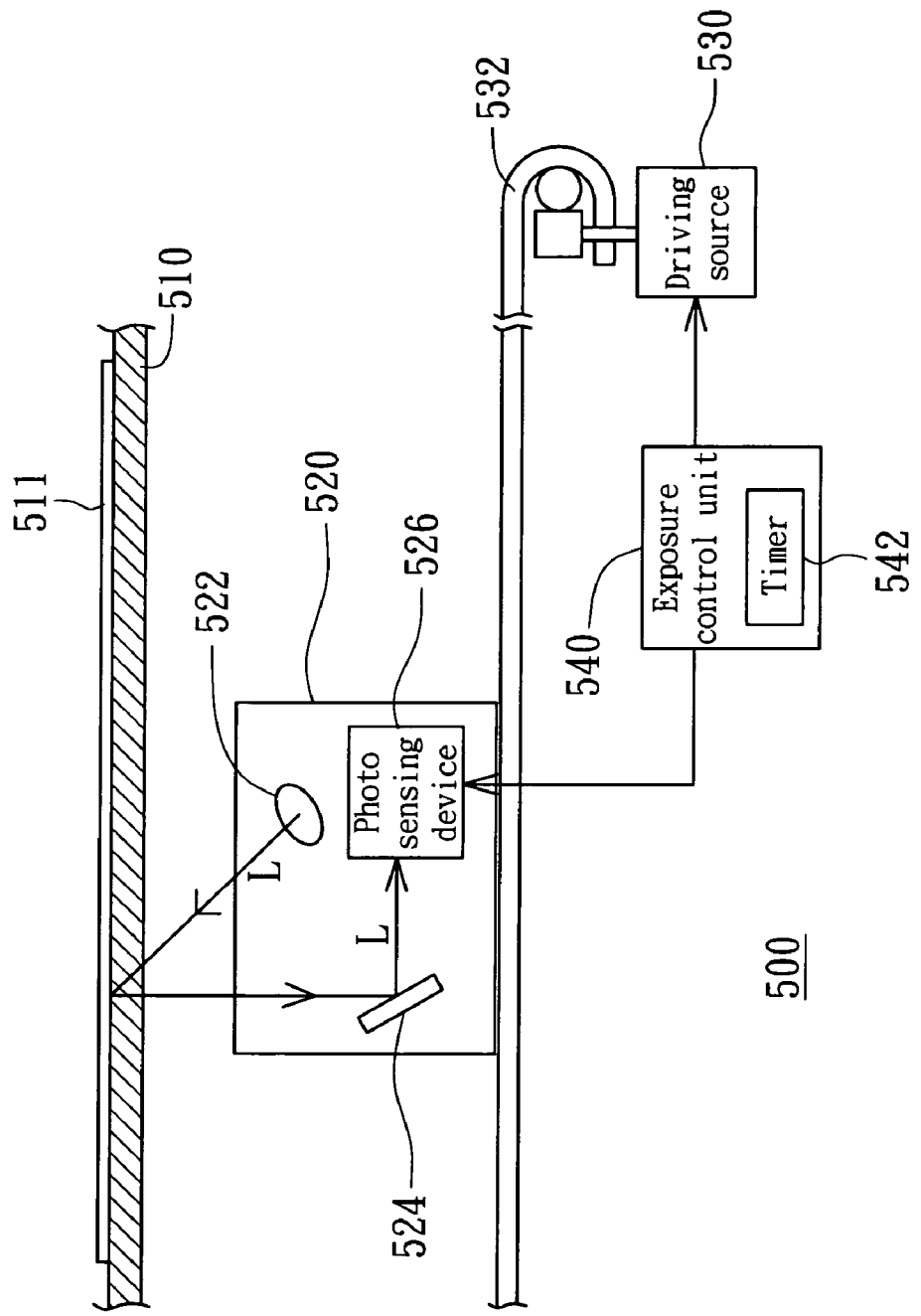
FIG. 3A is a schematic structure diagram of the scanner according to the second embodiment of the invention.

Referring to FIG. 3A, a schematic structure diagram of the scanner according to the second embodiment of the invention is shown. The scanner 500 includes a scan flatbed 510, an optical module 520, a driving source 530 (a step motor is exemplified here), and an exposure control unit 540, such as an ASIC. The scan flatbed 510 is for carrying the to-be-scanned document 511 (a reflective document is exemplified). The optical module 520 includes a light source 522, a mirror 524, a photo sensing device 526, such as a CCD or a CIS. The light L emitted from the light source 522, is reflected by the to-be-scanned document 511, then reflected by the mirror 524, and received by the photo sensing device 526. The photo sensing device 526 is for reading N (N is a natural number) scan lines (not shown in the figure) of the to-be-scanned document 511. In terms of a 600, dpi scanner, the to-be-scanned document has 600, scan lines per inch.

The driving source 530 drives the optical module 520 via the timing belt 532. Moreover, the ASIC 540 includes a timer 542 for controlling the photo sensing device 526 to read each scan line for a constant period of time. The ASIC 540 is for controlling the angular velocity of the driving source (step motor) 530 and rotating direction.

Figure 3B:
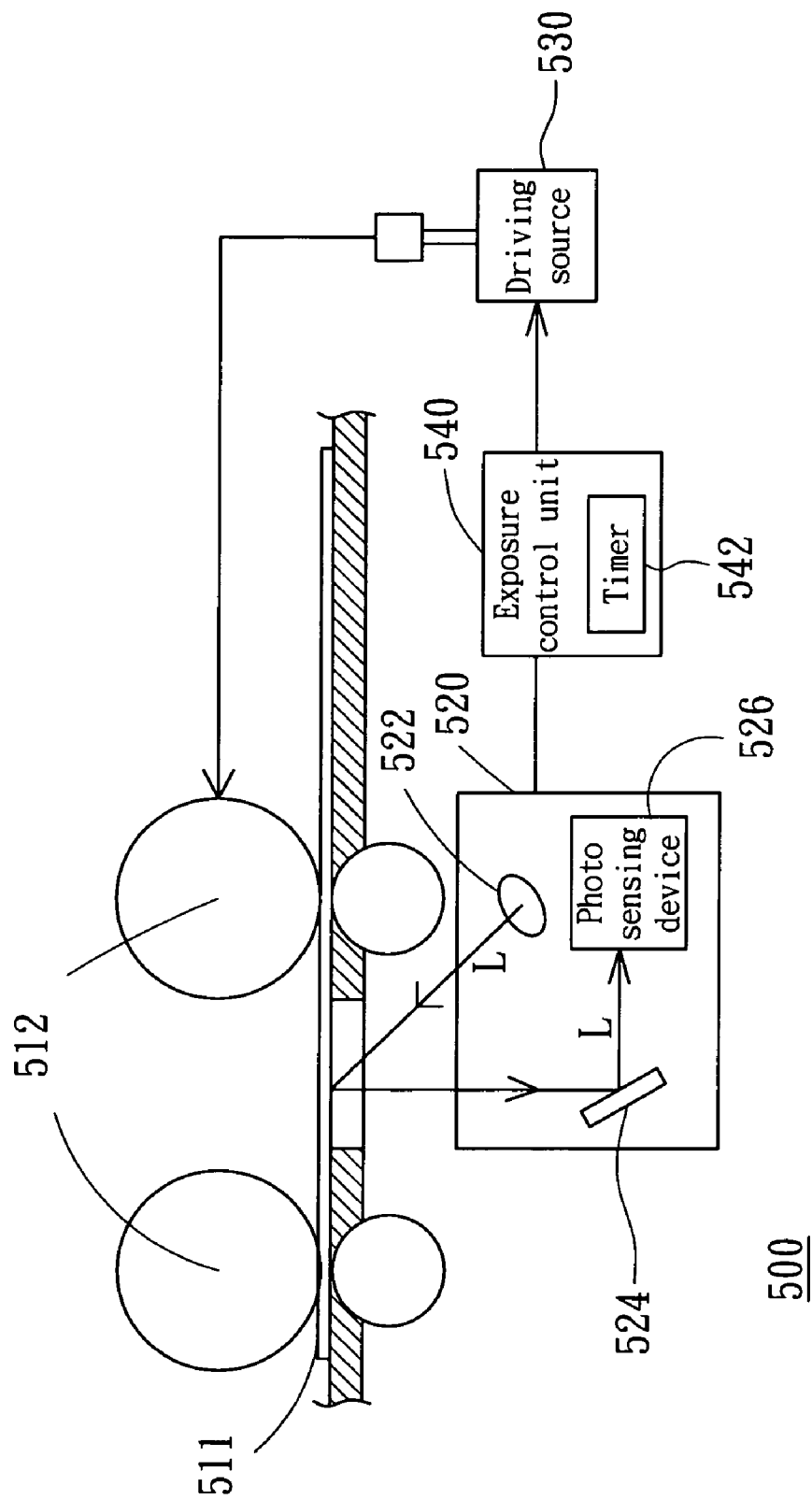
FIG. 3B is a schematic structure diagram of another scanner according to the second embodiment of the invention.

Referring to FIG. 3B, a schematic structure diagram of another. scanner according to the second embodiment of the invention is shown. The scanner 500 includes a document feeding device 512, an optical module 520, a driving source 530 (a step motor is exemplified here), and an exposure control unit 540. Different from the scanner 500 of FIG. 3A, the driving source 530 drives the document feeding device 512 to feed in the to-be-scanned document 511 such that the document 511 has a relative movement to a fixed optical module 520. The remaining parts are the same as those of the scanner 500 of FIG. 3A, so any detailed description is not necessarily given here.

Figure 3C:
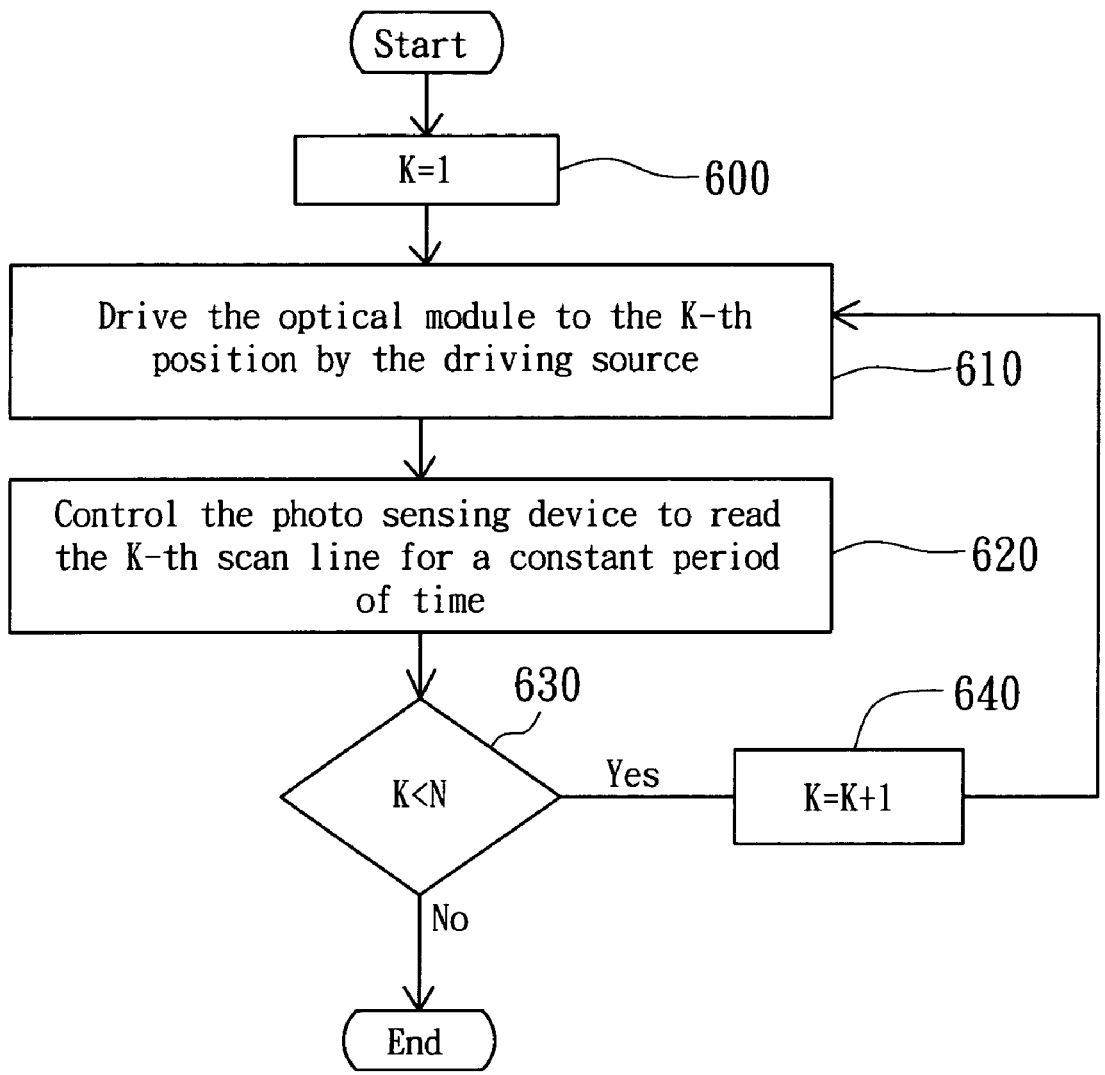
FIG. 3C is a flow chart of the scanning method according to the second embodiment of the invention.

Referring to FIG. 3C, a flow chart of the scanning method according to the second embodiment of the invention is shown. First, in step 600, set the value K to be 1. Next, in step 610, drive the optical module 520 to the K-th position by the driving source 530. That is, drive the optical module 520 to move to the position of the K-th step by the step motor. In step 620, control the photo sensing device 526 to read the K-th scan line for a constant period of time. Last, in step 630, determine if the value K is smaller than N. If the value K is smaller than N, continue the step 640 to add the value K by 1, and return the step 610. If the value K is not smaller than N, end up the scan process.

Figure 3D:
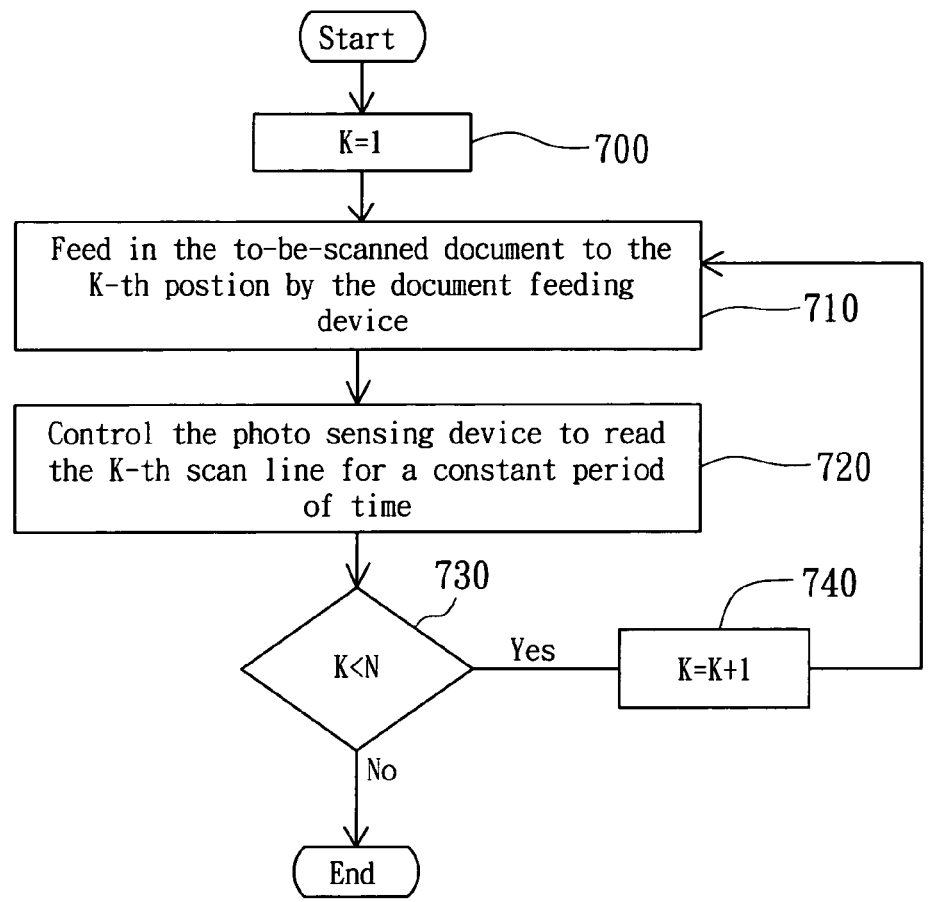
FIG. 3D is a flow chart of another scanning method according to the second embodiment of the invention.

Referring to FIG. 3D, a flow chart of another scanning method according to the second embodiment of the invention is shown. Different from the method of FIG. 3C, in the step 710, the driving source 530 is used to drive the document feeding device 512 to feed in the to-be-scanned document 511 to the K-th position for the optical module 520 to read the K-th scan line of the to-be-scanned document 511. The remaining steps are substantially the same as the method of FIG. 3C, so any detailed description is not necessarily given here.

As mentioned above, although the driving source 530 drives the optical module 520 at a constant speed, in fact, each moving step of the optical module 520 takes time of slight difference. Therefore, the exposure time for each scan line is different, resulting in different exposing amount for each scan line, and influencing the scan image quality. The object of the invention is to have a constant exposure time for each scan line and thus an equal exposing amount for each scan line.

Figure 3E:
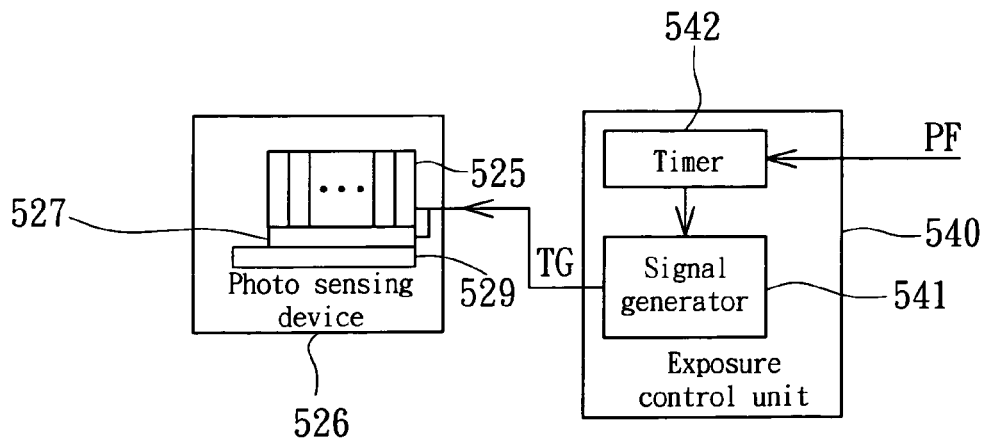
FIG. 3E is a schematic structure diagram of the exposure control unit for controlling the photo sensing device according to the second embodiment of the invention.

Referring to FIG. 3E, a schematic structure diagram of the exposure control unit 540 for controlling the photo sensing device 526 according to the second embodiment of the invention is shown. The photo sensing device 526 includes a photo diode 525, an analog shift register 529, and a transfer gate 527. The exposure control unit 540 includes a signal generator 541 and a timer 542. Different from the first embodiment, the photo sensing device 526 of the second embodiment has no electronic shutter. After the driving source 530 drives the optical module 520, the photo diode 525 can continuously accumulate charges. The signal generator 542 can send out a control signal TG to control the transfer gate 527 to transfer charges to the shift register 529 every constant time T according to the timer 542. Therefore, in each step that the photo sensing device 526 moves as driven by the driving source 530, the photo sensing device 526 can read the corresponding scan line of the to-be-scanned document 511 for a constant period of time.

In the above-mentioned embodiments, although the reflective document is taken as an example, the invention can also be applied to a transmissive document scanner. Moreover, the driving source of the invention is not limited to the DC motor or the step motor, any driving source capable of detecting the relative movement between the optical module and the to-be-scanned document can be applied to the invention.

The spirit of the invention lies in that the relative position of the optical module to the to-be-scanned document is detected by a detecting device and the exposure starting point is determined by the position signal generated according to the relative position. Therefore, the exposure control unit of the scanner can control the photo sensing device to read each scan line for line a constant period of time.

The invention not only solves the issue of motor speed non-uniformity in the prior art, but also provides scan images of stable quality without using extra complicated AFE gain adjusting circuit as disclosed in U.S. Pat. No. 6,047,584, and increasing manufacturing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanner, for scanning a plurality of scan lines of a to-be-scanned document, the scanner comprising:
   an optical module, comprising at least a photo sensing device, for exposing the scan lines of the to-be-scanned document and generating corresponding image data;
   a driving source, for generating a relative movement between the optical module and the to-be-scanned document;
   a detecting device, for detecting the relative movement between the optical module and the to-be-scanned document, and generating a position signal correspondingly; and
   an exposure control unit, comprising a timer, for controlling exposure time for each scan line to be a constant value;
   wherein the exposure control unit determines a starting point of the exposure time according to the signal.

2. The scanner according to claim 1, wherein the photo sensing device comprises a plurality of photo diodes and a transfer gate, and the exposure control unit comprises a signal generator for outputting a control signal to trigger the transfer gate to transfer out charges accumulated in the photo diodes.

3. The scanner according to claim 1, wherein the photo sensing device comprises a shutter, and the exposure control unit controls the shutter to make the exposure time constant.

4. The scanner according to claim 1, wherein the driving source is a DC motor.

5. The scanner according to claim 1, wherein the detecting device comprises an encoder for outputting the position signal to the exposure control unit.

6. The scanner according to claim 1, wherein the constant value is smaller than the time interval from the starting point of the exposure of one scan line to the starting point of the exposure of the successive scan line.

7. The scanner according to claim 1, wherein the driving source drives the optical module to generate the relative movement.

8. The scanner according to claim 1, further comprising a document feeding device, wherein the driving source drives the document feeding device to feed in the to-be-scanned document so as to generate the relative movement.

9. A scan method, applied in a scanner, for scanning a to-be-scanned document, the scanner comprising an optical module, a driving source, a detecting device, and an exposure control unit, the driving source for generating a relative movement between the optical module and the to-be-scanned document, the optical module having a photo sensing device for reading N scan lines of the to-be-scanned document, N being a natural number, the exposure control unit for controlling the exposure time for each scan line, the detecting device for detecting the relative movement between the optical module and the to-be-scanned document, the method comprising:
   setting a value K to be 1;
   generating a K-th position of the optical module relative to the to-be-scanned document corresponding to a K-th scan line of the to-be-scanned document;
   detecting the K-th position and outputting a K-th position signal accordingly;
   determining a K-th starting point of the exposure of the K-th scan line according to the K-th position signal;
   exposing the K-th scan line for a constant period of time starting from the K-th starting point; and
   adding the value K by 1 if the value K is smaller than N, and returning to the step of generating the K-th relative position.

10. The method according to claim 9, wherein the step of exposing the K-th scan line for the constant period of time further comprises
   determining a K-th ending point of the exposure of the K-th scan line by a shutter of the photo sensing device, wherein the time interval from the K-th starting point to the K-th ending point is a constant value for each of the N scan lines.

11. The method according to claim 9, wherein the constant value is smaller than the time interval from the (K+1)-th starting point to the K-th starting point.

12. The method according to claim 9, wherein the step of exposing the K-th scan line for the constant period of time further comprises:
   exposing the K-th scan line and accumulating a K-th amount of charges in the photo sensing device; and
   transferring out the k-th amount of charges by a transfer gate of the photo sensing device.

13. The method according to claim 9, wherein the driving source is a DC motor and the detecting device is an encoder for generating the K-th position signal.

14. The method according to claim 9, wherein the driving source drives the optical module to the K-th position relative to the to-be-scanned document.

15. The method according to claim 9, wherein the driving source drives the to-be-scanned document to the K-th position relative to the optical module.

16. A scanner, for scanning a plurality of scan lines of a to-be-scanned document, the scanner comprising:
   an optical module, comprising at least a photo sensing device, for exposing the scan lines of the to-be-scanned document and outputting corresponding image data;
   a driving source, for generating a relative movement between the optical module and the to-be-scanned document; and
   an exposure control unit, comprising a timer, for controlling the photo sensing device to read each scan line for a constant period of time.

17. The scanner according to claim 16, wherein the photo sensing device comprises a plurality of photo diodes and a transfer gate, and the exposure control unit comprises a signal generator coupled to the timer, for outputting a control signal to trigger the transfer gate and transfer out charges accumulated in the photo diodes.

18. The scanner according to claim 16, wherein the driving source is a step motor.

19. The scanner according to claim 16, wherein the driving source drives the optical module to generate the relative movement.

20. The scanner according to claim 16, further comprising a document feeding device, wherein the driving source drives the document feeding device to feed in the to-be-scanned document so as to generate the relative movement.

21. A scan method, applied in a scanner, for scanning a to-be-scanned document, the scanner comprising an optical module and a driving source, the driving source for generating a relative movement between the optical module and the to-be-scanned document, the optical module having at least a photo sensing device for sensing N scan lines of the to-be-scanned document N being a natural number, the method comprising:
   setting a value K to be 1;
   generating a K-th position of the optical module relative to the to-be-scanned document;
   exposing a K-th scan line for a constant period of time; and adding the value K by 1 if the value K is smaller than N, and returning to the step of generating the K-th relative position by the driving source.

22. The method according to claim 21, wherein the step of exposing the K-th scan line for the constant period of time further comprises:

accumulating charges in the photo sensing device and transferring out the charges from photo diodes of the photo sensing device.

* * * * *